United States Patent
Barnes (10) Patent No.: US 10,232,796 B2
(45) Date of Patent: Mar. 19, 2019

(54) SUPPORTING DEVICE

(71) Applicant: Jaguar Land Rover Limited, Coventry (GB)

(72) Inventor: Ian Barnes, Coventry (GB)

(73) Assignee: Jaguar Land Rover Limited, Coventry, Warwickshire (GB)

( * ) Notice: Subject to any disclaimer, the term of this patent is extended or adjusted under 35 U.S.C. 154(b) by 327 days.

(21) Appl. No.: 15/032,345

(22) PCT Filed: Oct. 28, 2014

(86) PCT No.: PCT/EP2014/073117
§ 371 (c)(1),
(2) Date: Apr. 27, 2016

(87) PCT Pub. No.: WO2015/063082
PCT Pub. Date: May 7, 2015

(65) Prior Publication Data
US 2016/0272125 A1 Sep. 22, 2016

(30) Foreign Application Priority Data
Oct. 28, 2013 (GB) .................................. 1319013.7

(51) Int. Cl.
*B60R 11/00* (2006.01)
*B60R 11/02* (2006.01)
(Continued)

(52) U.S. Cl.
CPC .......... *B60R 11/0252* (2013.01); *B60N 3/002* (2013.01); *F16M 11/041* (2013.01);
(Continued)

(58) Field of Classification Search
CPC ......... B60R 11/0252; B60R 2011/0007; B60R 2011/008; B60R 2011/0082; B60N 3/002; F16M 11/041; F16M 11/10; F16M 13/00
(Continued)

(56) References Cited

U.S. PATENT DOCUMENTS 5,443,018 A    8/1995  Cromwell
6,192,806 B1   2/2001  Chen
(Continued)

FOREIGN PATENT DOCUMENTS

FR    2 909 611 A1    6/2008
FR    2954246 A1      6/2011
WO    WO 2011/112552 A1   9/2011

OTHER PUBLICATIONS

Combined Search and Examination Report, GB 1319013.7, dated May 13, 2014, 6 pages.
(Continued)

*Primary Examiner* — Peter N Helvey
(74) *Attorney, Agent, or Firm* — Myers Bigel, P.A.

(57) ABSTRACT

The present invention relates to a supporting device (101, 201) for a tablet computer (105). The device (101, 201) includes a barrel (107) having an opening (111) for receiving an edge of the tablet computer (105). The device (101, 201) has a housing (106) and means (109) for rotatably mounting the barrel (107). The barrel (107) is rotatable about a longitudinal axis (X) between a first position in which the opening (111) is at least partially covered by the housing and at least a second position in which the opening (111) is exposed to receive the tablet computer (105). The housing (106) can, for example, take the form of a table. The supporting device (101, 201) can be provided in a vehicle.

17 Claims, 5 Drawing Sheets

(51) Int. Cl.
   *B60N 3/00* (2006.01)
   *F16M 11/04* (2006.01)
   *F16M 11/10* (2006.01)
   *F16M 13/00* (2006.01)

(52) U.S. Cl.
   CPC ............ *F16M 11/10* (2013.01); *F16M 13/00* (2013.01); *B60R 2011/0007* (2013.01); *B60R 2011/008* (2013.01); *B60R 2011/0082* (2013.01)

(58) Field of Classification Search
   USPC .......................................................... 224/539
   See application file for complete search history.

(56) References Cited

U.S. PATENT DOCUMENTS

| | | |
|---|---|---|
| 8,235,334 B1 | 8/2012 | Kobal |
| 2012/0074286 A1 | 3/2012 | Chou |
| 2013/0279100 A1 | 10/2013 | Fontana et al. |
| 2013/0327255 A1 | 12/2013 | Pajic |
| 2014/0191005 A1 | 7/2014 | Nick |

OTHER PUBLICATIONS

Notification of Transmittal of the International Search Report and the Written Opinion, PCT/EP2014/073117, dated Aug. 26, 2015, 14 pages.
Patents Act 1977 Examination Report under Section 18(3), UKIPO Application No. GB1319013.7, dated Nov. 18, 2015, 3 pp.

SUPPORTING DEVICE

RELATED APPLICATIONS

This application is a 35 U.S.C. § 371 national stage application of PCT Application No. PCT/EP2014/073117, filed on Oct. 28, 2014, which claims priority from Great Britain Patent Application No. 1319013.7 filed on Oct. 28, 2013, the contents of which are incorporated herein by reference in their entireties. The above-referenced PCT International Application was published in the English language as International Publication No. WO 2015/063082 A2 on May 7, 2015.

TECHNICAL FIELD

The present invention relates to a supporting device for a tablet computer, and a motor vehicle comprising such a supporting device.

BACKGROUND OF THE INVENTION

A known problem is to provide a support for a tablet computer in a vehicle, such as a motor vehicle. One solution is to provide means for mounting the tablet computer to the back of the front seats of the vehicle. However, this configuration does not allow a comfortable use of the tablet computer for the passengers. Moreover, it does not permit any adjustment of the orientation of the tablet computer.

At least in certain embodiments, the present invention sets out to ameliorate or overcome at least some of the problems associated with known assemblies.

SUMMARY OF THE INVENTION

Aspects of the present invention relate to a supporting device for a tablet computer.

According to a further aspect of the present invention, there is provided a device for supporting a tablet computer, the device comprising:
  a barrel having a longitudinal axis and comprising an opening for receiving an edge of the tablet computer;
  a housing; and
  means for rotatably mounting the barrel;
  wherein the barrel is rotatable about said longitudinal axis between a first position in which the opening is at least partially covered by the housing and a second position in which the opening is exposed to receive the tablet computer. In use, the opening is at least partially obscured from view when the barrel is in said first position. The opening can be elongated to receive an edge of the tablet computer. In use, the tablet computer can be supported in the barrel such that its display is visible to the user. The opening can comprise a longitudinal groove extending substantially along the longitudinal axis. The housing could be a portion of table intended to be mounted inside a motor vehicle. The barrel can comprise or consist of a cylindrical element. The supporting device could also support a smartphone.

Means for securing an edge of the tablet computer can be provided. The securing means can comprise two securing elements each disposed at an opposite end of the opening. The securing elements can be movable between an open position in which each securing element is disengaged from the corners of the tablet computer and a closed position in which a corner of the tablet computer is engaged in each securing element. The securing elements can each be pivotable between the open position and the closed position.

The device can comprise a longitudinal member. The longitudinal member can extend along the longitudinal axis and connect the two securing elements together. The longitudinal member can have a longitudinal groove for receiving the tablet computer. The longitudinal member can be movably mounted in the opening. For example, the longitudinal member can be movable in a radial direction. The longitudinal member can be biased radially outwards, for example by a spring member or a resilient element. The longitudinal groove can be formed in said longitudinal member.

The device can comprise a member for supporting the tablet computer. The supporting member could be connected to the barrel and could extend outwardly from the barrel. The barrel could have a length and the supporting member could extend longitudinally along at least a portion of the length of the barrel. The supporting member and the barrel could be formed integrally.

The device can comprise at least one gripping portion for rotating the barrel about the longitudinal axis. The at least one gripping portion can comprise a gnarled or ridged finish to facilitate gripping. The at least one gripping portion can be coated with an elastomer, such as rubber.

The barrel can be continuously adjustable between the first and the second position. A plurality of said second positions can be defined. A locating mechanism comprising a series of detents can be provided to locate the barrel in each said second position. A spring-biased element, such as a bearing or a pawl, can locate in the detents to releasably fix the barrel in said second position. The spring-biased element could be overcome by the continued rotation of the barrel to selectively position the barrel in said first position or one of said at least one second positions. Alternatively, the barrel can be rotatable between a plurality of said second positions. A lock or latch mechanism can be provide to fix the position of the barrel. In use, the viewing angle of the tablet computer can be adjusted by the selective positioning of the barrel in said at least one second position.

A docking station could optionally be integrated into the supporting device, for example to supply electrical power to the tablet computer.

According to a still further aspect of the present invention there is provided a device for supporting a tablet computer, comprising:
  at least one securing element for engaging a corner of a tablet computer,
  wherein each securing element is movable between a first position for receiving a respective corner of the tablet computer and a second position for engaging a respective corner of the tablet computer. The tablet computer has a display screen which is visible when the tablet computer is supported in the device. The securing element can be arranged to support the tablet computer from behind and in front. The securing element can comprise a front member for engaging a front face of the tablet computer and a rear member for engaging a rear face of the tablet computer. The securing element can, for example, have a generally triangular profile so as not to overlap the display screen.

Each securing element can define a recess or aperture in which the corner of the tablet computer operatively locates. In said first position, the recess can face outwardly to receive the corner of the tablet computer. In said second position, the recess can face laterally to locate the tablet computer in said device. The first position can be an open position and the second position can be a closed position. The securing element can be moulded from a rigid plastics material. A lining or coating could optionally be applied to the securing element to protect the tablet computer.

The device can further comprise a housing or support member. An aperture, for example a recess or channel, can be formed in the housing or support member. The securing element(s) can be at least partially retracted into said aperture when in said open position. Conversely, the securing element(s) can project or extend at least partially out of the aperture when in said closed position. The at least one securing element can be mounted in said aperture.

Each securing element can comprise a transverse member for engaging a lower edge of the tablet computer. The transverse member can, for example, comprise a bar. The transverse member can be arranged to displace the securing element from said first position to said second position when the tablet computer is located therein. For example, locating the tablet computer in said securing element can apply a force on said transverse member which displaces the securing element from said first position to said second position.

Each securing element can comprise a pivoting coupling. The pivoting coupling can accommodate a pivoting movement of said securing element between said first position and said second position. The pivoting coupling can, for example, comprise a pivot pin for defining a pivot axis of the securing element. The transverse member can be inset from (and optionally also above) said pivot axis. Thus, when the tablet computer is located in said securing element, the securing element can pivot from said first position to said second position.

A biasing means, such as a spring element, can be provided for biasing the securing element towards said first position. When the tablet computer is located in said securing element, the biasing means is overcome to displace the securing element to said second position.

The device can comprise a longitudinal groove for receiving a portion of said tablet computer. The at least one securing element can be arranged to locate said portion of the tablet computer in the longitudinal groove as the securing element moves from said first position to said second position. The device can comprise first and second securing elements positioned at opposite ends of said longitudinal groove.

A resilient member can be provided in said longitudinal groove. The resilient member can be arranged to contact a front surface and/or a back surface of the tablet computer when said portion of the tablet computer is located in said longitudinal groove. The resilient member can comprise a rubberized surface for retaining said tablet computer in position. The resilient member could be formed from an elastomer, such as rubber.

The device described herein could be modified to support a cellular telephone. The device could have particular application in supporting a cellular telephone having a touch screen.

According to a further aspect of the present invention there is provided a table incorporating a supporting device as described herein.

According to a further aspect of the present invention there is provided a motor vehicle comprising a supporting device as described herein.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

DETAILED DESCRIPTION OF AN EMBODIMENT

Figure 1:
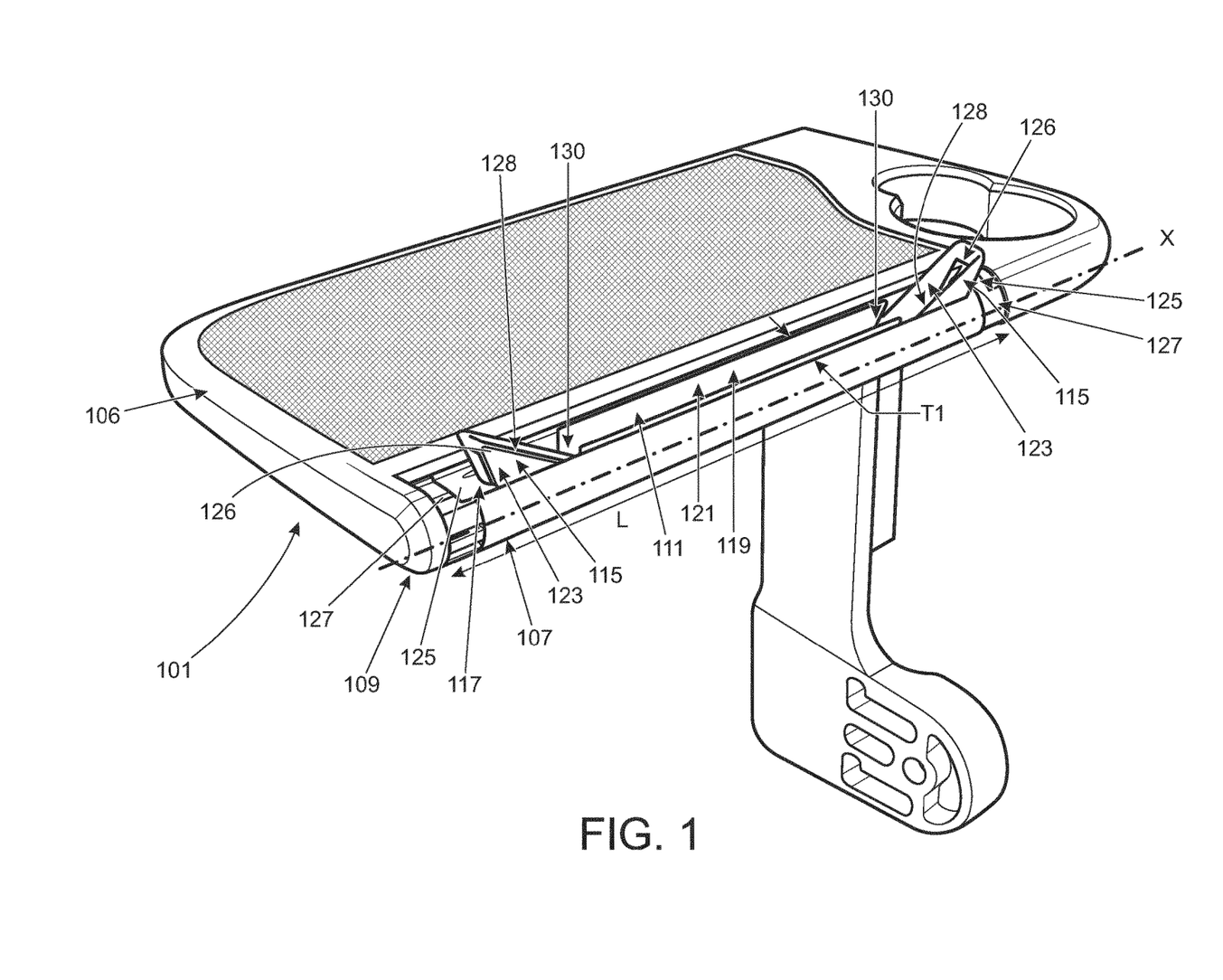
FIGS. 1 and 2 show a perspective view of a device for supporting a tablet computer in accordance with a first embodiment of the invention.
Figure 2:
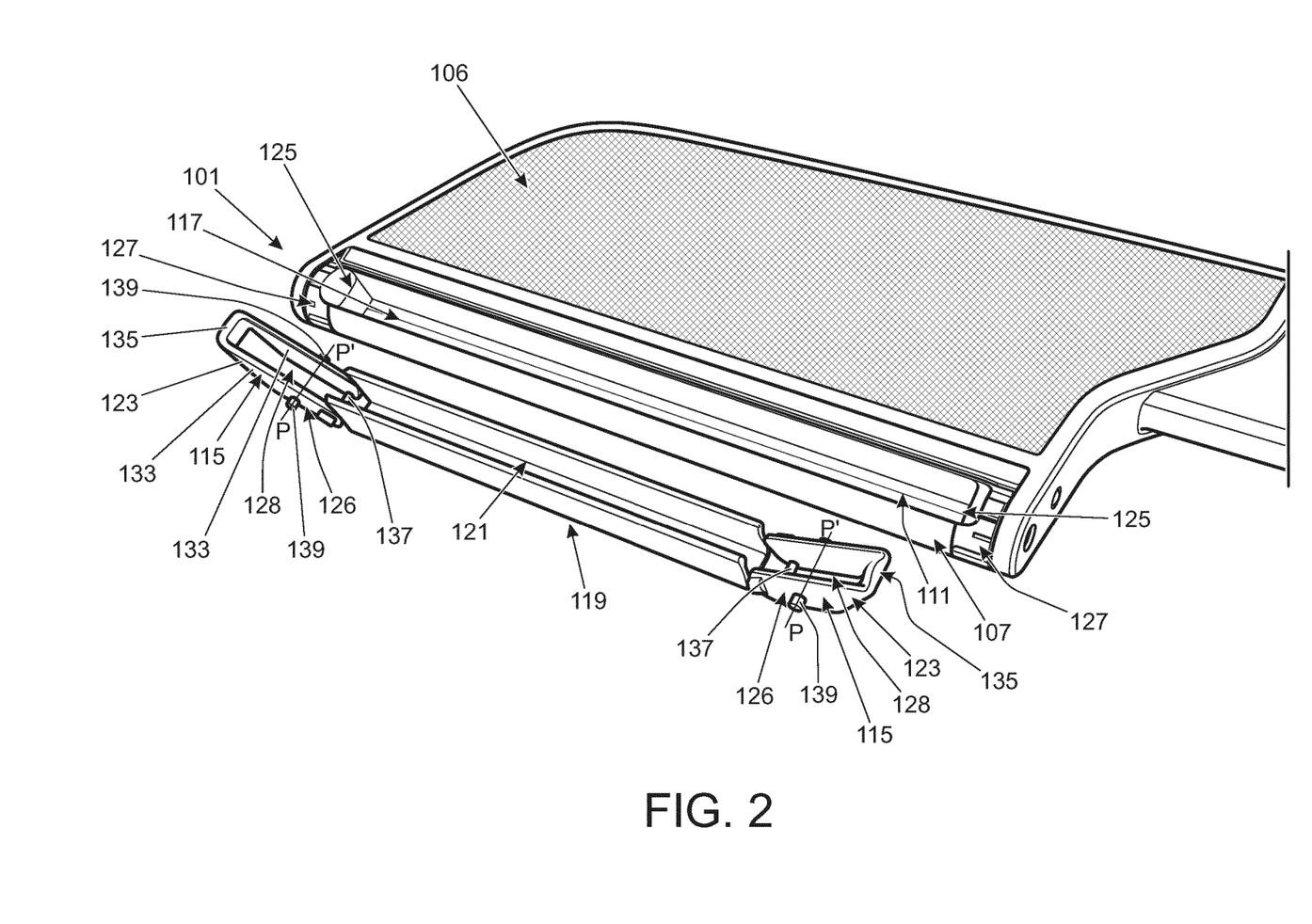

A supporting device 101 in accordance with a first embodiment of the present invention will now be described with reference to FIGS. 1 and 2. The supporting device 101 is intended for supporting a tablet computer 105, such as an Apple iPad® or a Samsung Galaxy Tablet®. The supporting device 101 in the present embodiment is integrated into a deployable table 106 located inside a motor vehicle.

The supporting device 101 comprises a housing 106, for instance a portion of the table 106, and a cylindrical barrel 107 having a longitudinal axis X. The barrel 107 is rotatably mounted to enable rotation about the longitudinal axis X relative to the table 106. The supporting device 101 further comprises an opening 111 for receiving a lower edge 113 of the tablet computer 105 and means 115 for securing the tablet computer 105 in position.

The barrel 107 extends along a length L parallel to the longitudinal axis X. The barrel 107 defines the opening 111. The opening 111 extends along the longitudinal axis X. The opening 111 extends along part of the length L of the barrel 107. Alternatively, the opening 111 could extend along the entire length L of the barrel 107.

In this first embodiment, the opening 111 receives a longitudinal member 119 extending parallel to the longitudinal axis X. The longitudinal member 119 is a resilient member, for example having a rubberized finish, to protect the surface of the tablet computer 105 when it is located in the opening 111. The longitudinal member 119 defines a longitudinal groove 121 for receiving an edge 113 of the tablet computer 105. The longitudinal groove 121 has a thickness T1 that substantially matches the thickness of the edge 113 of the tablet computer 105, that is the thickness T1 of the longitudinal groove 121 and the thickness of the edge 113 of the tablet computer 105 are similar, so that inserting the edge 113 of the tablet computer 105 into the longitudinal groove 121 is sufficient for locating the tablet computer 105.

The supporting device 101 further comprises two securing elements 123 for securing the edge 113 of the tablet computer 105 into the longitudinal groove 121. Each securing element 123 is disposed at an opposite end 125 of the barrel 107. As shown in FIG. 2, each securing element 123 is formed with a shell 126, that comprises two sidewalls 133 facing each other and connected to each other by a transverse portion 135. The sidewalls 133 and the transverse portion 135 define a recess 128 for receiving a corner 131 of the tablet computer 105. Each securing element 123 further comprises a transverse bar 137 extending substantially parallel to the transverse portion 135. In the present embodiment the securing elements 123 are made of a rigid plastics material but they could be made of other materials, such as metal. The distance between the securing elements 123 could be adjustable to accommodate different sizes of tablet computers or mobile telephones. Alternative configurations of the supporting device 101 could comprise only one securing element 123.

In the present embodiment, a circular protuberance 139 is formed on each sidewall 133 to form an axle for pivotably mounting the respective securing elements 123. The protuberances 139 extend transversely and locate in cooperating apertures (not shown) in the barrel 107 to pivotably mount the securing elements 123. In use, the securing elements 123 pivot about respective pivot axes P-P′ and are each pivotable between an open position and a closed position. The protuberances 139 are formed on the sidewalls 133 such that the transverse bars 137 are laterally inset from the pivot axes P-P′ of the respective securing element 123. When the securing elements 123 are in their open positions, the recess 128 of each securing element 123 faces outwardly (i.e. towards the opening 111 in the barrel 107) for receiving the tablet computer 105. The securing elements 123 are retracted into the opening 111 when they are in said open position, thereby permitting the barrel 107 to rotate into the recess formed in the housing 106. The securing elements 123 are pivoted to their respective closed positions when the tablet computer 105 is located in the opening 111. The inset arrangement of the transverse bars 137 relative to the protuberances 139 results in the securing elements 123 pivoting towards each other when the tablet computer 105 is located therein. In the closed position, a corner 131 of the tablet computer 105 is engaged in each securing element 123. The securing elements 123 engage the tablet computer 105 to inhibit relative movement between the tablet computer 105 and the barrel 107. The tablet computer 105 is thereby fixedly maintained in position. Each securing element 123 can further comprise a biasing mechanism, such as a spring, for biasing the securing element 123 towards the open position.

The mounting means 109 is arranged to allow the barrel 107 to rotate about its longitudinal axis X between a first position and a plurality of second positions. In the first position, the opening 111 is at least partially hidden or obscured by the table 106. In each of said second positions, the opening 111 is exposed to receive the tablet computer 105. The barrel 107 is continuously adjustable between the first position and the second positions. Alternatively, the mounting means 109 can comprise a plurality of detents for defining a number of predetermined positions of the barrel 107. A button (not shown) may be provided at the end of the barrel which, when pressed, mechanically moves a detent mechanism such that the barrel can be rotated, and when released causes the detent mechanism to engage with the barrel, locking it in position. The barrel 107 comprises two annular gripping portions 127, each being disposed at the opposite ends 125 of the barrel 107, for enabling the user to rotate the barrel 107 between said first position and one or more of said second positions; or between different said second positions. The barrel 107 can thereby be selectively rotated to allow a user to alter the viewing angle of the tablet computer 105. The barrel 107 could optionally be spring biased towards said first position.

The operation of the supporting device 101 will now be described. Initially, the barrel 107 is in said first position in which the opening 111 is hidden. The user rotates the barrel 107 to one of said second positions to expose the opening 111. The securing elements 123 are in initially in their respective open positions. The user can thereby insert an edge 113 of the tablet computer 105 into the longitudinal groove 121 and into the securing elements 123. The corners 131 of the tablet computer 105 press down on the transverse bar 137 of each securing element 123, so that the securing elements 123 pivot about their respective pivot axes P-P′ from their open position to their closed position. The application of downwards pressure overcomes the spring bias of the securing elements 123 and they are displaced to their closed positions. The lower corners 131 of the tablet computer 105 are received in the securing elements 123, thereby securing the tablet computer 105 in position. In order to adjust the vertical orientation of the tablet computer 105, the user can rotate the gripping portions 127 in order to rotate the barrel 107 around its longitudinal axis X to said second positions. When the user wants to remove the tablet computer from the supporting device 101, the user can lift the tablet computer 105 clear of the securing elements 123. The securing elements 123 are then returned to their open position under the spring bias and the barrel 107 can be returned to its first position (in which the opening 111 is hidden).

Figure 3:
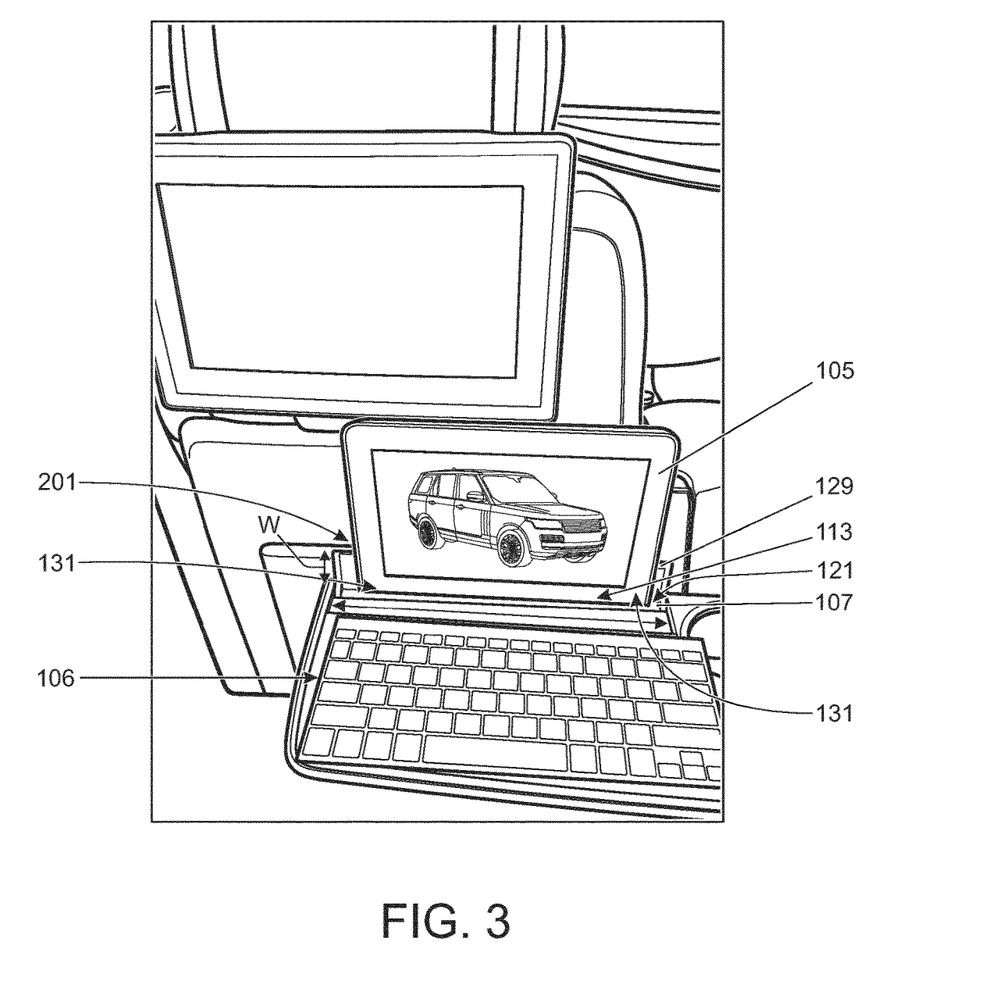
FIG. 3 shows a front view of a device for supporting a tablet computer in accordance with a second embodiment of the invention.
Figure 4:
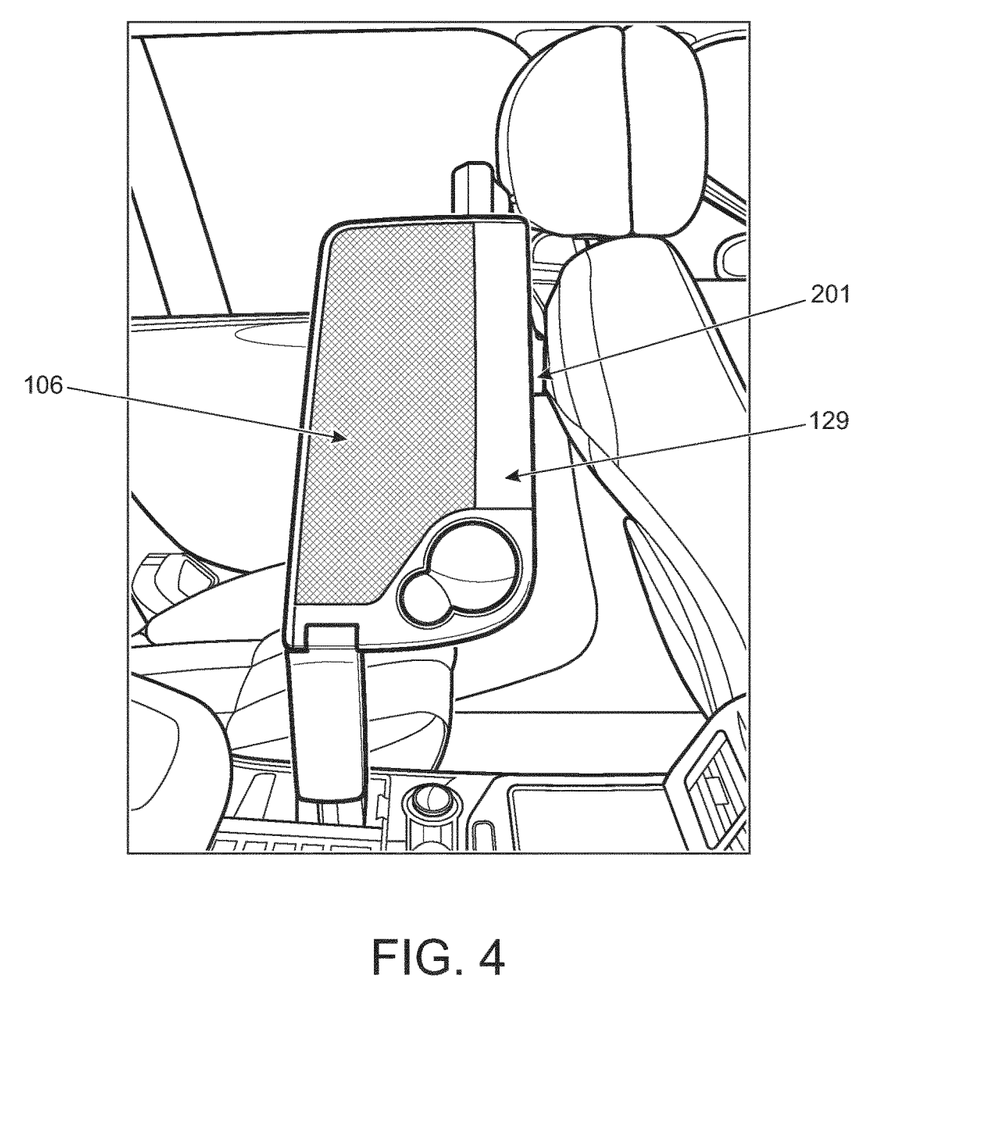
FIGS. 4 and 5 show the device of FIG. 3 in the first and a second positions respectively.
Figure 5:
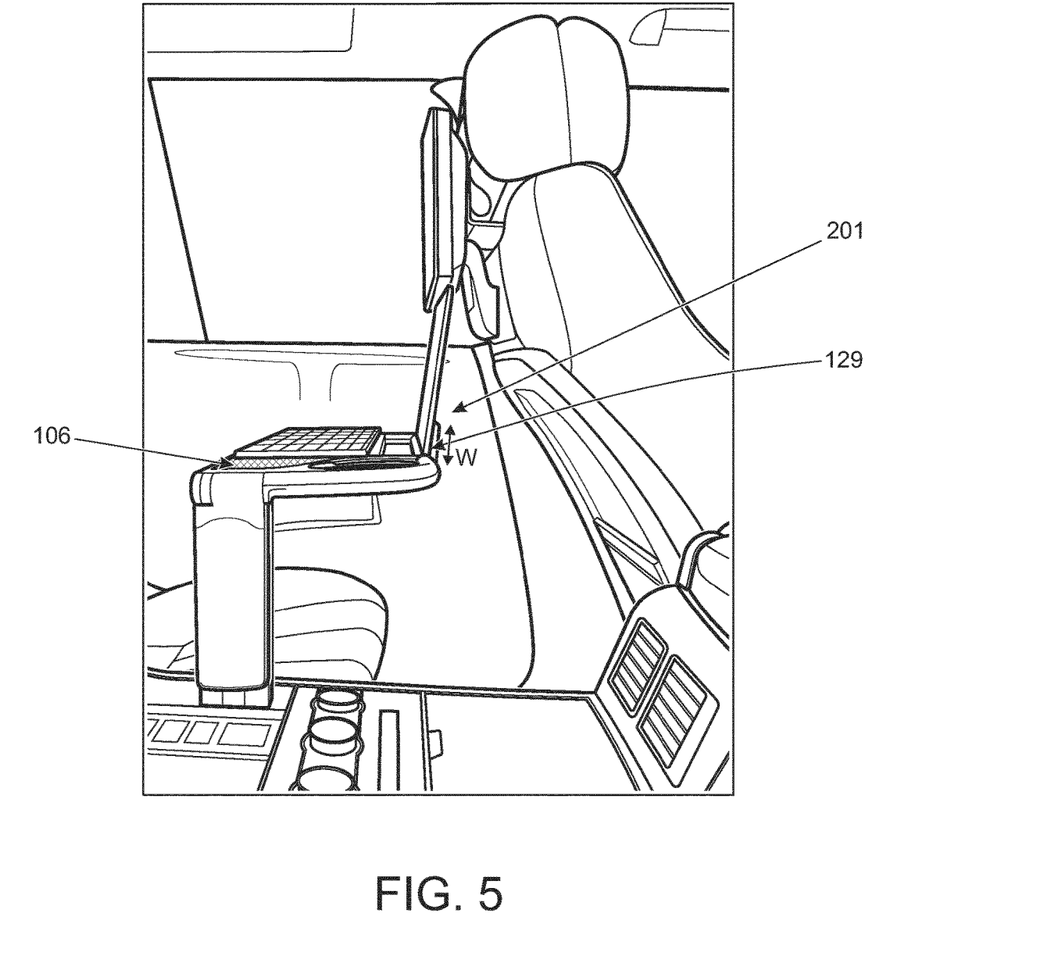

A supporting device 101 according to a second embodiment will now be described with reference to FIGS. 3 to 5. The supporting device 101 according to the second embodiment is based closely on the first embodiment 101 and like reference numerals will be used for like components. A supporting member 129 is provided for supporting the back of the tablet computer 105. The supporting member 129 is for instance a supporting plate 129. The supporting plate 129 is connected to the barrel 107 and extends outwardly from the barrel 107, for instance tangentially outwards from the barrel 107. Alternatively, the supporting plate 129 extends radially outwards from the barrel 107. The supporting plate 129 extends along the entire length L of the barrel 107. Alternatively, the supporting plate 129 could extend along only a part portion of the length L of the barrel 107. The supporting plate 129 and the barrel 107 in the present embodiment are formed integrally and machined from aluminium, but other materials could be used. For example, the supporting plate 129 and the barrel 107 could be moulded from a plastics material as a single piece. As in the first embodiment described above, the barrel 107 is rotatable between a first position in which the opening 111 is concealed, as shown in FIG. 5, and at least one second position in which the opening 111 is exposed to receive the tablet computer 105, as shown in FIG. 4. The operation of the supporting device 101 according to the second embodiment is unchanged from that of the first embodiment.

It will be appreciated that various changes and modifications can be made to the apparatus described herein without departing from the scope of the present invention. For example, even if no securing means 115 are shown on FIGS. 3 to 5, the supporting device 201 according to the second embodiment of the present invention can be provided with such securing means.

The first embodiment has been described with reference to securing elements 123 for engaging each corner of the tablet computer 105. A modified arrangement could comprise front and back engagement members for engaging the front and back of the tablet computer 105 when it is located in the supporting device 101. The front and back engagement members could be movable relative to each other to engage the tablet computer 105 when it is inserted between them. One or both of said front and back engagement members could be pivotable about an axis disposed parallel to the longitudinal axis X. The front and back engagement members could be biased towards each other, for example by a spring element.

Further aspects of the present invention are set out in the following numbered paragraphs:

1. A device (101, 201) for supporting a tablet computer (105), comprising:
   a barrel (107) having a longitudinal axis (X) and comprising an opening (111) for receiving an edge of the tablet computer (105);
   a housing (106); and
   a mount (109) for rotatably mounting the barrel (107);
   wherein the barrel (107) is rotatable about said longitudinal axis (X) between a first position in which the opening (111) is at least partially covered by the housing and a second position in which the opening (111) is exposed to receive the tablet computer (105).
2. A device (101, 201) as described in paragraph 1, wherein the opening (111) comprises a longitudinal groove (121) extending substantially along the longitudinal axis (X).
3. A device (101) as described in paragraph 2, wherein the longitudinal groove (121) is formed in a longitudinal member (119) disposed in said opening (111).
4. A device (101, 201) as described in paragraph 1, comprising a securing apparatus (115) for securing an edge (113) of the tablet computer (105).
5. A device (101) as described in paragraph 4, wherein the securing apparatus (115) comprises first and second opposing securing elements (123).
6. A device (101) as described in paragraph 5, wherein the securing elements (123) are each movable between an open position for receiving a respective corner (131) of the tablet computer (105) and a closed position for engaging a respective corner (131) of the tablet computer (105).
7. A device (101) as described in paragraph 6, wherein the securing elements (123) are pivotable between the open position and the closed position.
8. A device (201) as described in paragraph 1, comprising a member (129) for supporting the tablet computer (105), the supporting member (129) being connected to the barrel (107) and extending outwardly from the barrel (107).
9. A device (201) as described in paragraph 8, wherein the barrel (107) has a length (L) and wherein the supporting member (129) extends longitudinally along at least a portion of the length (L) of the barrel (107).
10. A device (201) as described in paragraph 8, wherein the supporting member (129) and the barrel (107) are formed integrally.
11. A device (101, 201) as described in paragraph 1 comprising at least one gripping portion (127) for rotating the barrel (107) about the longitudinal axis (X).
12. A device (101, 201) as described in paragraph 1, wherein the barrel (107) is continuously adjustable between the first position and a plurality of said second positions.
13. A device (101, 201) as described in paragraph 12, wherein the barrel (107) is rotatable between the first position and a plurality of said second positions.
14. A device (101, 201) as described in paragraph 1, wherein the housing (106) is a portion of a table intended to be mounted inside a motor vehicle.
15. A device (101, 201) for supporting a tablet computer (105), comprising:
    at least one securing element (123) for engaging a corner (131) of a tablet computer (105),
    wherein each securing element (123) is movable between a first position for receiving a respective corner (131) of the tablet computer (105) and a second position for engaging a respective corner (131) of the tablet computer (105).
16. A device (101, 201) as described in paragraph 15, wherein each securing element (123) comprises a front member for engaging a front face of the tablet computer (105) and a rear member for engaging a rear face of the tablet computer (105).
17. A device (101, 201) as described in paragraph 15, wherein each securing element (123) comprises a transverse member (137) for engaging a lower edge of the tablet computer (105) to displace the securing element (123) from said first position to said second position.
18. A device (101, 201) as described in paragraph 15, wherein each securing element (123) is pivotably mounted to pivot between said first position and said second position.
19. A device (101, 201) as described in paragraph 15 comprising a spring element for biasing each securing element (123) towards said first position.
20. A device (101, 201) as described in paragraph 15 comprising a longitudinal groove (121) for receiving a portion of said tablet computer (105); wherein said at least one securing element (123) is arranged to locate said portion of the tablet computer (105) in the longitudinal groove (121).
21. A device (101, 201) as described in paragraph 20 comprising a resilient member (119) for engaging a front surface and/or a back surface of the tablet computer (105) when said portion of the tablet computer (105) is located in said longitudinal groove (121).
22. A device (101, 201) as described in paragraph 21, wherein said resilient member (119) comprises a rubberized surface for retaining said tablet computer (105) in position.
23. A table (106) having a device (101, 201) as described in paragraph 1 integrated therein.
24. A motor vehicle comprising a device (101, 201) as described in paragraph 1.

The invention claimed is:

1. A device for supporting a tablet computer, the device comprising:
   a housing; and
   a barrel rotatably mounted to the housing, wherein the barrel has a longitudinal axis (X) and comprises an opening for receiving an edge of the tablet computer and a securing element configured to engage a corner of the tablet computer, wherein the securing element is movable between an open position for receiving the corner of the tablet computer and a closed position for engaging the corner of the tablet computer,
   wherein the barrel is rotatable about the longitudinal axis (X) between a first position in which the opening is at least partially covered by the housing and a second position in which the opening is exposed to receive the tablet computer.

2. The device of claim 1, wherein the securing element is pivotable between the open position and the closed position.

3. The device of claim 1, wherein the opening comprises a longitudinal groove extending substantially along the longitudinal axis (X).

4. The device of claim 3, wherein the longitudinal groove is in a longitudinal member disposed in the opening.

5. The device of claim 1, further comprising a member for supporting the tablet computer, wherein the supporting member is connected to the barrel and extends outwardly from the barrel.

6. The device of claim 5, wherein the barrel has a length (L), and wherein the supporting member extends longitudinally along at least a portion of the length (L) of the barrel.

7. The device of claim 5, wherein the supporting member and the barrel are formed integrally.

8. The device of claim 1, further comprising at least one gripping portion for rotating the barrel about the longitudinal axis (X).

9. The device of claim 1, wherein the barrel is continuously adjustable between the first and a plurality of the second positions.

10. The device of claim 1, wherein the barrel is rotatable between the first position and a plurality of second positions.

11. The device of claim 1, wherein the housing is a portion of a table configured to be mounted inside a motor vehicle.

12. The device of claim 1, wherein the securing element comprises a front member for engaging a front face of the tablet computer and a rear member for engaging a rear face of the tablet computer.

13. The device of claim 1, wherein the securing element comprises a transverse member for engaging a lower edge of the tablet computer to displace the securing element from the open position to the closed position.

14. The device of claim 1, further comprising a biasing mechanism configured to urge the securing element towards the open position.

15. The device of claim 1, further comprising a longitudinal groove for receiving a portion of the tablet computer, wherein the securing element is arranged to locate the portion of the tablet computer in the longitudinal groove.

16. The device of claim 15, further comprising a resilient member for engaging a front surface and/or a back surface of the tablet computer when the portion of the tablet computer is located in the longitudinal groove, and wherein the resilient member comprises a rubberized surface for retaining the tablet computer in position.

17. A motor vehicle comprising the device of claim 1.

* * * * *